United States Patent
Bouvy et al.

(10) Patent No.: US 6,995,210 B2
(45) Date of Patent: Feb. 7, 2006

(54) AQUEOUS DISPERSION BASED ON VISCOUS SILICONE OILS CROSSLINKABLE BY CONDENSATION INTO AN ADHERING ELASTOMER FOR USE IN PARTICULAR AS SEALANTS OR PAINTS, PREPARATION METHOD

(75) Inventors: Bernard Bouvy, Tassin la Demi-Lune (FR); Martial Deruelle, Millery (FR); Michel Feder, Villeurbanne (FR)

(73) Assignee: Rhodia Chimie, Boulogne Billancourt (FR)

( * ) Notice: Subject to any disclaimer, the term of this patent is extended or adjusted under 35 U.S.C. 154(b) by 92 days.

(21) Appl. No.: 10/312,425

(22) PCT Filed: Jun. 29, 2001

(86) PCT No.: PCT/FR01/02105

§ 371 (c)(1),
(2), (4) Date: Jul. 21, 2003

(87) PCT Pub. No.: WO02/00770

PCT Pub. Date: Jan. 3, 2002

(65) Prior Publication Data

US 2004/0054070 A1    Mar. 18, 2004

(30) Foreign Application Priority Data

Jun. 30, 2000 (FR) .................................. 00 08551

(51) Int. Cl.
*C08K 3/20* (2006.01)
(52) U.S. Cl. .................. 524/837; 524/588; 524/492
(58) Field of Classification Search ................ 524/837
See application file for complete search history.

(56) References Cited

U.S. PATENT DOCUMENTS

| 4,221,688 A | | 9/1980 | Johnson et al. | 260/29.2 |
| 5,851,594 A | * | 12/1998 | Feder et al. | 427/387 |
| 5,895,794 A | * | 4/1999 | Berg et al. | 523/217 |
| 6,521,699 B2 | * | 2/2003 | Feder et al. | 524/588 |

FOREIGN PATENT DOCUMENTS

| EP | 0 166 397 | | 1/1986 |
| EP | 0 354 015 | | 2/1990 |
| EP | 0 606 671 | | 7/1994 |
| FR | 2 753 708 | | 3/1998 |
| WO | WO94/09059 | | 4/1994 |
| WO | 98/13410 | * | 4/1998 |

* cited by examiner

*Primary Examiner*—Margaret G. Moore

(57) ABSTRACT

The invention concerns an aqueous dispersion of viscous silicone oils capable of being crosslinked into an elastomer by water elimination (condensation). The invention aims at obtaining an aqueous silicone dispersion corresponding to an optimal compromise in terms of adherence of the crosslinked elastomer on all types of supports, and the colloidal stability of the dispersion during preparation and storage. Said aqueous dispersion comprises a viscous silicone oil A, optionally a crosslinking agent B, optionally an adhesion promoter C (silane), a filler D, a catalyst E, an emulsifier F, optionally a functional additive G and water. Said dispersion is characterised in that the filler D is input into the process for obtaining the dispersion, in the form of an aqueous suspension of at least a hydrophilic compound ($CaCO_3SiO_2$, $TiO_2$, $Al_2/H_2O$, organic polymer latex). The invention also concerns the preparation of said particularly stable dispersion since it has a residual emulsion rate T not less than 70%. The invention is useful for producing concentrated sealants and elastomer coating for insulating polymer foam (polyurethane).

11 Claims, No Drawings ed elastomer by removal of water, which overcomes the drawbacks of the analogous products according to the prior art.

AQUEOUS DISPERSION BASED ON VISCOUS SILICONE OILS CROSSLINKABLE BY CONDENSATION INTO AN ADHERING ELASTOMER FOR USE IN PARTICULAR AS SEALANTS OR PAINTS, PREPARATION METHOD

This application is an application under 35 U.S.C. Section 371 of International Application Number PCT/FR01/02105 filed on Jun. 29, 2001.

The present invention relates to a novel aqueous dispersion based on viscous silicone oils that may be crosslinked into an elastomer by removal of water (condensation). This crosslinked elastomer may be used to produce mastics or any other sealing material, or alternatively flame-retardant or water-repellent elastomeric coverings and coatings, which may be sprayable, eg: paints and flexible semi-thick coverings.

The present invention is also directed toward the preparation of this aqueous silicone dispersion.

Conventionally, aqueous dispersions of silicone oils comprise:

A—at least one polyorganosiloxane oil capable of crosslinking into an elastomer by condensation and removal of water;
B—optionally at least one crosslinking agent;
C—optionally at least one adhesion promoter preferably consisting of at least one silane;
D—a siliceous or nonsiliceous organic and/or mineral filler;
E—optionally a curing catalyst (tin-condensation catalyst);
F—at least one emulsifier (ionic or nonionic surfactant);
G—one or more other functional additives;
H—and water.

These aqueous silicone dispersions that may be crosslinked into an elastomer by condensation with removal of water or alcohol are easy to use, especially in construction, on account of their water-washable nature.

However, these products have raised a certain number of technical difficulties;
stability on storage (degree of coalescence),
excessively long curing time,
mediocre mechanical properties of the elastomer (hardness, elasticity, abrasion resistance),
lack of thixotropy of the elastomer,
lack of "combable" nature of the elastomer,
problem of safety and toxicity due to the solvents and alcohols formed by hydrolysis,
low adhesion and cohesion properties of the elastomer to the usual supports,
stability of emulsion during formulation and storage (degree of coalescence),
ease of emulsification and of formulation of the dispersion,
possibility of continuous preparation depending on the industrial constraints.

Among all these specification details, there is one that is particularly important for assessing the quality of an aqueous silicone dispersion. This is the adhesion of the elastomer formed from the aqueous silicone dispersion after evaporation of the water or even the alcohol of condensation. The desired adhesion for the elastomer should be understood both in terms of adhesion strength on a given support and in terms of adhesion to a wide range of different supports (glass, wood, metal, concrete, PVC and polyurethane). The search for adhesion is all the more difficult since it is generally performed to the detriment of the colloidal stability of the dispersion.

Perfectible aqueous silicone dispersions are thus known, especially as regards improving the adhesion.

American patent U.S. Pat. No. 4,221,688 discloses an aqueous silicone dispersion capable of forming an elastomer by condensation/drying. This dispersion is obtained by emulsion polymerization, which requires the use of an anionic surfactant for stabilization. Among the fillers incorporated into this aqueous silicone dispersion is an aqueous dispersion of colloidal silica.

The necessary presence of an ionic surfactant, usually an anionic surfactant, is harmful to the stability of the aqueous silicone dispersion (mastic). It reduces its performance qualities, for example as regards the adhesion and the mechanical properties. The aqueous dispersions obtained by the process according to the patent have a low concentration and low stability, in particular in a freezing/thawing cycle.

The low adhesion of the elastomers obtained from these emulsion-polymerized aqueous silicone dispersions is linked to the high concentration of surfactants. This method of production by emulsion polymerization should be distinguished from the preparation of aqueous silicone dispersions according to an operating protocol involving an emulsification of an already-polymerized silicone, an optional dilution of the emulsion and a formulation of the dispersion ("compounding").

The said American patent does not address, and with reason, the use of colloidal silica during the emulsification.

It should moreover be added that this technique is restrictive and relatively uncompetitive.

European patent applications EP 0 665 861 and EP 0 665 862 describe the preparation of a mastic made of an aqueous silicone dispersion, by emulsification of a viscous reactive silicone oil optionally containing a crosslinking agent (for example a hydroxylated silicone resin), a catalyst and a filler incorporated in pulverulent form (for example precipitated and coated calcium carbonate), and also a nonionic surfactant (polyethoxylated nonylphenol), optionally adhesion promoters of the alkoxylated silane type (vinyltrimethoxysilane, N-methyl-3-aminopropyl-trimethoxysilane, N-aminoethyl-3-aminopropyltrimethoxy-silane or 3-aminopropyltriethoxysilane) and, naturally, water introduced during the emulsification into the viscous phase.

The aqueous silicone dispersions according to said patents are prepared, precisely, according to a principle of emulsification in concentrated phase, with mixtures of water and structured surfactants having a high viscosities.

These aqueous dispersions, based on $\alpha,\omega$-functional viscous silicone oils, are stable on storage (fine particle size and absence of anionic surfactants) and are capable of crosslinking by elimination of water, or even of alcohol, into an elastomer whose mechanical properties are satisfactory. These dispersions contain a dispersed silicone polymer whose degree of polymerization is better controlled than that of a polymer obtained by emulsion polymerization.

Although having properties that are overall entirely respectable, the aqueous silicone dispersions described in said patents were open to improvement as regards the adhesion/colloidal stability during preparation and storage compromise.

One of the essential objectives of the present invention is that of significantly optimizing the abovementioned adhesion/stability compromise.

Another essential objective of the invention is that of proposing an aqueous silicone dispersion that may be crosslinked into an elastomer by removal of water, which overcomes the drawbacks of the analogous products according to the prior art.

Another essential objective of the invention is that of providing an aqueous silicone dispersion that has reduced concentrations of surfactants, without the colloidal stability of the dispersion being affected.

Another essential objective of the present invention is that of proposing a silicone dispersion that may be obtained readily by emulsification, optional dilution and formulation ("compounding").

Another essential objective of the invention is that of providing a highly concentrated aqueous silicone dispersion.

Another essential objective of the invention is that of providing an aqueous silicone dispersion that may be obtained with equal ease in batchwise mode or in continuous mode with industrial constraints.

Another essential objective of the invention is that of providing a simple and economical process for preparing an aqueous silicone dispersion of the abovementioned type.

Another essential objective of the invention is that of proposing a process for preparing the abovementioned dispersion, said process needing to be applicable in batchwise mode and in continuous mode with industrial constraints and while ensuring reliability under all circumstances.

Another essential objective of the invention is that of providing an aqueous silicone dispersion whose adhesion and stability are significantly improved compared with the existing dispersions, and which moreover satisfies the abovementioned specification.

Another essential objective of the invention is that of providing an aqueous silicone dispersion that may be used for the manufacture of concentrated mastics, elastomeric coating products or water-repellent or flame-retardant protective coverings, which may be sprayable ("roofing").

These objectives, among others, are achieved by the present invention, which relates firstly to an aqueous dispersion of silicone oil(s) comprising:

A—100 parts by weight of at least one polyorganosiloxane oil (A) capable of crosslinking into an elastomer by condensation, if necessary in the presence of a crosslinking agent (B);
B—if necessary, from 0.1 to 100 parts by weight of at least one crosslinking agent (B);
C—optionally, up to 50 parts by weight of at least one adhesion promoter (C)—preferably a silane—;
D—up to 200 parts by dry weight of a filler (D);
E—a catalytically effective amount of a catalytic curing compound (E), which may be up to 3 parts by weight;
F—at least one emulsifier (F);
G—optionally, at least one functional additive (G);
H—and water;
said dispersion being obtained:
by production of an emulsion by blending a mixture consisting of:
100 parts by weight of a silicone phase ($\phi s$) with a dynamic viscosity at 25° C. of at least 10 Pa.s, preferably 50 Pa.s and even more preferably 70 Pa.s, $\phi s$ comprising the oil or a mixture of oils (A) already polymerized, and optionally at least one of the constituents (B), (C) or (E);
0.5–20 parts by weight of at least one emulsifier (F), the HLB value of said emulsifier or of the mixture of emulsifiers being at least 10;
0–100 parts by weight of filler (D);
2–20 parts by weight of water;
the water/water+surfactant(s) weight ratio being such that the viscosity of the water+surfactant(s) mixture is in the region of or greater than half that of the silicone phase ($\phi s$);
for a period and under shear conditions that are sufficient to obtain an "oil-in-water" emulsion with a particle size from about 0.1 to 5 micrometers;
by optional dilution with water until a solids content from 25% to 97% is obtained;
and then by addition
of the constituent(s) not present in the silicone phase ($\phi s$)
and/or of 0–100 parts by weight of filler (D);
characterized
in that the filler (D) is supplied, in the process for obtaining the dispersion, in the form of (an) aqueous suspension(s) of at least one hydrophilic compound, with the conditions according to which:
when the filler (D) supplied in the process for obtaining the dispersion consists at least partly of at least one aqueous suspension of colloidal silica, then this (or these) aqueous suspension(s) of filler (D) is (are) introduced in total into the blending chamber before producing the emulsion;
and when the filler (D) supplied in the process for obtaining the dispersion consists at least partly of at least one aqueous suspension of organic (co) polymer(s), then at least some of this (or these) aqueous suspension(s) of filler (D) is (are) introduced into the blending chamber before producing the emulsion.

This production characteristic, namely the use of a hydrophilic filler predispersed in water, makes it possible, entirely surprisingly and unexpectedly, to lower the dose of surfactants in the silicone dispersion and to improve the adhesion of the elastomer that may be obtained from said dispersion, without degrading the colloidal stability of the dispersion.

The colloidal stability of the dispersion is evaluated by means of the residual emulsion content T (%) measured according to an operating protocol P defined below in example 1.

Furthermore, the use of a hydrophilic filler predispersed in water makes it possible to limit the coalescence under shear of the concentrated emulsion in the first step for preparing the dispersion according to the invention.

The dispersion according to the invention also has the advantage of being prepared according to a procedure that poses no particular practical difficulties, especially as regards the emulsification.

In addition, the aqueous silicone dispersion according to the invention may be highly concentrated. Using a filler in aqueous dispersion rather than a powdered filler significantly improves the "processability" of the aqueous dispersions according to the invention, such that their continuous production is fully controlled.

The present invention may be likened to a selection of a hydrophilic filler that is used in aqueous suspension during the preparation of the dispersion.

The inventors have, to their credit, made this selection which induces, against all expectation, particularly efficient characteristics in terms of adhesion and colloidal stability.

According to one preferred characteristic of the invention, the filler (D) consists of particles of hydrophilic compound (s) with a relatively high specific surface area Ss, ie:

$Ss>3$ preferably $Ss>5$.

In accordance with the invention, the aqueous dispersion is also characterized by excellent colloidal stability, reflected by a residual emulsion content T (%) measured according to a protocol P such that:

T≧70 preferably T≧80 and even more preferably T≧85

It was not in any way foreseeable that the use, in the form of a colloidal aqueous suspension, of a filler made of at least one hydrophilic compound, would give such values for T.

According to one advantageous characteristic of the invention, the dispersion draws its specificity from the fact that this (or these) aqueous suspension(s) of filler (D) is (are) introduced totally or partially into the blending chamber before producing the emulsion; the fraction of suspension(s) of filler (D) that may be introduced before producing the emulsion is between 2% and 100% and preferably between 3% and 100%, by dry weight of the total amount of filler (D) taken in dry form.

For example, when the filler (D) is $CaCO_3$ and when only one fraction of the aqueous colloidal suspension of filler (D) is introduced into the chamber for preparing the dispersion, before producing emulsion, this fraction of filler (D) advantageously represents between 2% and 40% and preferably between 3% and 30%, by dry weight of the total amount of filler (D) taken in dry form.

It will be understood that the characteristics for producing the dispersion vary according to the nature of the hydrophilic filler (D).

Another advantageous characteristic of the dispersion according to the invention relates to the fact that all the water required to produce the emulsion comes from the aqueous suspension(s) supplying the filler (D).

Advantageously, the concentration of hydrophilic filler (D) in the aqueous colloidal suspension is between 1% and 90% by dry weight, preferably between 20% and 90% by dry weight and even more preferably between 50% and 90% by dry weight.

In point in fact, the solids content of this colloidal suspension also depends on the amount of water that it is desired to supply to the dispersion via the colloidal filler.

In practice and generally, the particle size of the hydrophilic compounds constituting the filler (D) is between 0.0001 and 300 µm. This particle size depends of course on the nature of the hydrophilic compounds.

According to one preferred arrangement of the invention, the filler (D) is selected from the group of hydrophilic compounds comprising: $CaCO_3$, $SiO_2$, $TiO_2$, $Al_2O_3/H_2O$, emulsified organic (co)polymer(s) and mixtures thereof.

These hydrophilic compounds capable of constituting the solid particulate filler (D) may be obtained by precipitation from a liquid and/or by grinding.

When it is a particulate filler (D) obtained by precipitation, it is possible for said precipitation to take place from water. This then gives directly an aqueous colloidal suspension of filler (D), which may be used for the preparation of the dispersion according to the invention.

According to one variant, this suspension may be obtained by incorporating the pulverulent dry filler (D) into water.

Thus, "slurries" of precipitated $CaCO_3$ or of ground $CaCO_3$ exist, for example.

As regards silica $SiO_2$, it may be colloidal silica, precipitation silica or pyrogenic silica.

The term "colloidal silica" denotes a stable suspension of differentiated, substantially spherical silica particles between 0.00001 and 0.1 µm in size, and preferably between 0.001 and 0.05 µm.

Emulsified organic copolymers are more commonly known under the name "latex" or "nanolatex". They are, for example, aqueous dispersions of polymer particles obtained from standard processes of emulsion (co)polymerization of one or more polymerizable organic monomers. These organic monomers are preferably chosen from:

a): alkyl (meth)acrylates, the alkyl portion of which preferably contains from 1 to 18 carbon atoms, in particular methyl acrylate, ethyl acrylate, propyl acrylate, n-butyl acrylate, isobutyl acrylate, amyl acrylate, lauryl acrylate, isoamyl acrylate, 2-ethyl-2-hexyl acrylate, octyl acrylate, methyl methacrylate, chloroethyl methacrylate, butyl methacrylate, 3,3-dimethylbutyl methacrylate, ethyl methacrylate, isobutyl methacrylate, isopropyl methacrylate, phenyl methacrylate, butyl chloroacrylate, methyl chloroacrylate, ethyl chloroacrylate, isopropyl chloroacrylate and cyclohexyl chloroacrylate;

b): α,β-ethylenically unsaturated esters of monocarboxylic acids, the acid portion of which is unpolymerizable, and the unsaturated portion of which preferably contains from 2 to 14 carbon atoms and the acid portion of which contains from 2 to 12 carbon atoms, in particular vinyl acetate, vinyl propionate, vinyl butyrate, alkyl acetate, vinyl versatate® (registered trademark for $C_9$–$C_{11}$ α-branched acid esters), vinyl laurate, vinyl benzoate, vinyl trimethylacetate, vinyl pivalate and vinyl trichloroacetate;

c): esters and hemiesters of α,β-ethylenically unsaturated polycarboxylic acids containing from 4 to 24 carbon atoms, in particular dimethyl [lacuna], diethyl maleate, methyl ethyl fumarate and 2-ethylhexyl fumarate;

d): vinyl halogens, in particular vinyl chloride, vinyl fluoride, vinylidene chloride and vinylidene fluoride;

e): vinylaromatics preferably containing not more than 24 carbon atoms and chosen in particular from styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-tert-butylstyrene, 4-dichlorostyrene, 2,6-dichlorostyrene, 2,5-difluorostyrene and 1-vinylnaphthalene;

f): conjugated aliphatic dienes preferably containing from 3 to 12 carbon atoms, in particular 1,3-butadiene, isoprene and 2-chloro-1,3-butadiene;

g): α,β-ethylenically unsaturated nitriles preferably containing from 3 to 6 carbon atoms, such as acrylonitrile and methacrylonitrile.

It is also possible to copolymerize at least one of the main monomers a) to g) with up to 40% by weight of at least one other monomer of ionic nature, in particular:

an α,β-ethylenically unsaturated carboxylic acid monomer mentioned above, including monocarboxylic and polycarboxylic acids (acrylic acid, methacrylic acid, maleic acid, itaconic acid, fumaric acid, etc.), an ethylenic monomer comprising secondary, tertiary or quaternized amine groups (vinylpyridines, diethylaminoethyl methacrylate, etc.), a sulfonated ethylenic monomer (vinylsulfonate, styrenesulfonate, etc.), a zwitterionic ethylenic monomer (sulfopropyl-(dimethylaminopropyl) acrylate) or an ethylenic monomer of nonionic nature, in particular, unsaturated carboxylic acid amides (acrylamide, methacrylamide, etc.), esters of (meth)acrylates and of polyhydroxypropyl or polyhydroxyethylated alcohols, vinylsilanes and/or acrylic silanes (such as vinyl-trimethoxysilane and vinyltriethoxysilane).

According to one variant, the dispersions according to the invention may comprise, in addition to the hydrophilic filler (D) supplied in the form of an aqueous colloidal suspension, a filler (D') that is involved in the process for obtaining the dispersion, in pulverulent form. This filler (D') supplied in powder form to the mixture leading to the dispersion differs from the dry hydrophilic filler (D) in terms of its smaller specific surface area Ss (m²/g), ie:

$$Ss \leq 5$$

preferably $Ss \leq 3$.

Examples of pulverulent fillers (D') that may be mentioned include: $CaCO_3$, $SiO_3$, $TiO_2$, $Al_2O_3/H_2O$.

Advantageously, the filler (D') may represent 5 to 100 parts by dry weight per 100 parts by weight of silicone phase φs.

As regards the silicone phase (φs), and in particular the essential constituent(s) thereof: the oil(s) (A), it is important to note that, in accordance with the invention, oils (A) of specific nature and viscosity have been selected.

The dynamic viscosity of the oil (A) and thus of the silicone phase φs is greater than or equal to 10 Pa.s, preferably greater than or equal to 50 Pa.s and more preferably greater than or equal to 70 Pa.s. This viscosity is an important parameter of the invention. This parameter may be determined, for example, using a Brookfield viscometer according to AFNOR standard NFT 76 102 02 February 1972.

Advantageously, the oils (A) are α,ω-hydroxylated oils or functional oils comprising, per molecule, at least 2 functional groups that may be condensed optionally after hydrolysis.

Even more specifically, these oils (A) may be represented by the general formula (I) below:

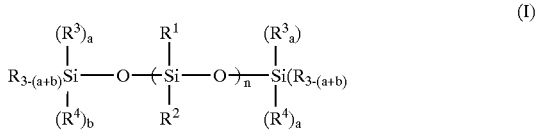

(I)

in which formula:

$a$ is 0 or 1

$b$ is 0 or 1 with $a+b=0$; 1 or 2

$n$ has a value that is sufficient to give the polymer of formula (a) the desired viscosity the radicals R are identical or different and represent
  an OH group with $a+b=2$;
  an alkoxy or alkenyloxy group containing from 1 to 10 carbon atoms;
  an aryloxy group containing from 6 to 13 carbon atoms;
  an acyloxy group containing from 1 to 13 carbon atoms;
  a ketiminoxy group containing from 1 to 8 carbon atoms;
  a an amino-functional or amido-functional group containing from 1 to 6 carbon atoms, linked to the silicon via an Si—N bond;

the radicals $R^1$ and $R^2$ are identical or different and represent alkyl or alkenyl aliphatic organic groups containing from 1 to 10 carbon atoms, or phenyl aromatic groups, said groups optionally being substituted with halogen atoms or cyano groups;

the radicals $R^3$ and $R^4$ are identical or different and represent alkyl, aminoalkyl, polyaminoalkyl, epoxyalkyl or alkenyl aliphatic organic groups, containing from 1 to 13 carbon atoms, or aryl aromatic groups containing from 6 to 13 carbon atoms; at least 2 functional groups that may be condensed optionally after hydrolysis being present per molecule of at least 80% of the radicals $R^1$ to $R^4$ representing a methyl group.

Examples of radicals R that may be mentioned include the following groups:
  alkoxy such as, for example, methoxy, ethoxy or octyloxy;
  alkenyloxy such as, for example, vinyloxy, hexenyloxy or isopropenyloxy;
  aryloxy such as, for example, phenyloxy;
  acyloxy such as, for example, acetoxy;
  ketiminoxy such as, for example, $ON=C(CH_3)C_2H_5$;
  amino-functional groups such as, for example, ethylamino or phenylamino;
  amido-functional groups such as, for example, methylacetamido.

Among the aliphatic or aromatic organic radicals mentioned above, mention may be made of, as regards
  $R^1$, $R^2$: for example, methyl, ethyl, octyl, trifluoropropyl, vinyl and phenyl groups;
  $R^3$, $R^4$: for example, methyl, ethyl, octyl, vinyl, allyl and phenyl groups;
  —$(CH_2)_3$—$NH_2$; —$(CH_2)_3$—$NH$—$(CH_2)_2$—$NH_2$;

As concrete examples of units D: $R^1R^2SiO_{2/2}$ present in the oil (A), mention may be made of:
$(CH_3)_2SiO_{2/2}$; $CH_3(CH_2=CH)SiO_{2/2}$; $CH_3(C_6H_5)SiO_{2/2}$; $(C_6H_5)_2SiO_{2/2}$ As concrete examples of units M: $RR^3R^4SiO_{1/2}$, mention may be made of:
$(CH_3)_2(OH)SiO_{1/2}$; $(OCH_3)_3SiO_{1/2}$; $[O—C(CH_3)=CH_2]_3SiO_{1/2}$; $[ON=C(CH_3)]_3SiO_{1/2}$; $(NH—CH_3)_3SiO_{1/2}$; $(NH—CO—CH_3)_3SiO_{1/2}$.

A crosslinking agent (B) must be used when the oil (A) is an α,ω-(dihydroxy)polydiorganosiloxane polymer.

Many crosslinking agents may be used in amounts that depend on their nature; these agents are well known to those skilled in the art.

A list of crosslinking agents will be found hereinbelow, by way of example, with the recommended corresponding amounts, expressed as parts by weight per 100 parts of oil (A):
  0.5 to 10 parts of sodium silicate
  0.1 to 15 parts of an alkali metal organosiliconate (European patent EP-A-266 729)
  1 to 100 parts of a microemulsion of silsesquioxane resin (patents U.S. Pat. Nos. 3,355,406; 3,433,780)
  5 to 100 parts of a reactive silicone resin of low molecular mass containing alkoxy and acyloxy groups (U.S. Pat. No. 4,554,187)
  5 to 100 parts of a silicone resin of high mass, which is insoluble in toluene (EP-A-304 719)
  5 to 100 parts of a hydroxylated silicone resin consisting of units of formulae $R'_3SiO_{1/2}$ (M) and/or $R'_2SiO_{2/2}$ (D), combined with units of formula $R'SiO_{3/2}$ (T) and/or $SiO_2(Q)$, R' mainly being a $C_1$–$C_6$ alkyl, vinyl or 3,3,3-trifluoro-propyl radical, and a weight content of hydroxyl group of between 0.1 and 10%. Among these resins, mention may be made most particularly of the resins MQ, MDQ, TDM and TD (FR-A-2 638 166).
  1 to 20 parts of a silane of formula:

$$(R'')_aSiX_{(4-a)}$$

in which formula R″ is a monovalent organic radical, in particular methyl or vinyl, $u$ is equal to 1 or 0, X is a condensable and/or hydrolyzable organic group of the same definition as the radical R of formula (I) above (alkoxy, alkenyloxy, acyloxy, ketiminoxy, alkylamino or alkylamido silanes described especially in U.S. Pat. Nos. 3,294,725; 4,584,341; 4,618,642; 4,608,412; 4,525,565; EP-A-387 157; EP-A-340 120; EP-A-364 375; FR-A-1 248 826; FR-1 023 477).

Examples that may be mentioned include the following alkoxysilanes:

$Si(OC_2H_5)_4$; $CH_3Si(OCH_3)_3$; $CH_3Si(OC_2H_5)_3$;
$(C_2H_5O)_3Si(OCH_3)$; $CH_2=CHSi(OCH_3)_3$;
$CH_3(CH_2=CH)Si(OCH_3)_2$; $CH_2=CH(OC_2H_5)_3$;
$CH_2=CHSi[ON=C(CH_3)C_2H_5]$;
$CH_3Si[ON=C(CH_3)_2]_3$;
$CH_3Si[-C(CH_3)=CH_2]_3$;
methyltri (N-methylacetamidosilane); methyltris-(cyclohexylaminosilane).

The adhesion promoters (C) are preferably silanes. These silanes (C) optionally present in the composition of the dispersions of the invention are additives that make it possible to modify the physicochemical properties of the silicone elastomer compositions obtained after crosslinking the dispersions forming the subject of the invention.

The silanes obtained as by-products of the reaction for the synthesis of the oils (A) may be represented by the formula:
$(R^5)_cSi(R)_{4-c}$ in which formula:

$c$ is 0; 1 or 2 the radicals $R^5$, which may be identical or different, correspond to the radicals $R^3$ and $R^4$ of the oil (A) of formula (I)

the radical R corresponds to the organic radical R of the polyorganosiloxane oil (A) of formula (I).

Examples of such silanes that may be mentioned include the crosslinking silanes mentioned above. They are generally present in amounts of about from 0 to 10 parts by weight, and preferably of about from 0 to 5 parts by weight, per 100 parts of oil(s) (A).

The silane additives for modifying the physicochemical properties may especially be adhesion agents such as those described in patent application EP-A-340 120. Mention may be made especially of aminopropyltriethoxysilane, aminopropylmethyldiethoxy-silane and glycidoxypropyltrimethoxysilane. They are used in amounts that may be up to 50%, generally of about from 0.5% to 10%, of the weight of oil(s) (A).

Catalytic curing compounds (E) are well known to those skilled in the art; they are carboxylic acid salts and halides of metals such as, for example, lead, zinc, zirconium, titanium, iron, barium, calcium, manganese and, most particularly, tin.

Mention may be made of:
the products of reaction of tin dicarboxylates and of polyethyl silicate (U.S. Pat. No. 3,862,919),
the products of reaction of dibutyltin diacetate and of an alkyl silicate or of an alkyltrialkoxysilane (BE-A-842 305),
tin bischelates (EP-A-147 323; 235 049),
diorganotin dicarboxylates (GB-A-1 289 900).

They may be used in amounts that may be up to about 3 parts by weight, preferably in the region of 0.05 to 1 part by weight, per 100 parts of oil (A).

The emulsifiers (F) used may be ionic or nonionic surfactants or water-soluble polymers.

They are preferably nonionic surfactants. Examples that may be mentioned include alkoxylated fatty acids, polyalkoxylated alkylphenols, polyalkoxylated fatty alcohols, polyalkoxylated or polyglycerolated fatty amides, polyglycerolated alcohols and α-diols, ethylene oxide/propylene oxide block polymers and also alkylglucosides, alkylpolyglucosides, sucroethers, sucroesters, sucroglycerides, sorbitan esters and ethoxylated compounds of these sugar derivatives.

According to one variant, the emulsifiers (F) are selected from anionic surfactants such as, for example, alkylbenzene sulfonates, alkyl sulfates, alkyl ether sulfates, alkylaryl ether sulfates and dioctyl sulfosuccinates, of alkali metals.

The (mixture of) emulsifier(s) is chosen as a function of the nature of the silicone oil (A) to be emulsified; an HLB value of about 11 to 15 is generally chosen to emulsify a silicone oil (A) consisting of an α,ω-bis(hydroxy)polydimethylsiloxane polymer. The water/water+emulsifier(s) (F) weight ratio depends on the viscosity of the silicone phase (φs) and on the nature of the (mixture of) surfactant(s); this ratio is, for example, from about 20/100 to 70/100, preferably from about 25/100 to 60/100, to stabilize an emulsion of a silicone phase consisting of an α,ω-dihydroxylated oil with a viscosity from about 30 to 500 Pa.s, using a nonylphenol containing 9 or 10 ethoxy units as sole emulsifier (F).

According to one particular embodiment of the invention, the aqueous silicone dispersion is obtained by using a colloidal silica dispersion (D) is at least one nonionic surfactant (F), this colloidal silica and this or these nonionic surfactant(s) being incorporated into the mixture at least partially during the emulsification so as to facilitate said emulsification.

In practice, the silicone phase (φs) consists of:
(φs1) an oil (A) with a viscosity of at least 10 Pa.s,
(φs2) a mixture of oils (A), this mixture having a viscosity of at least 10 Pa.s,
(φs3) a mixture of at least one oil (A) and of at least one crosslinking agent (B) if the latter is necessary and/or a silane (C), this mixture having a viscosity of at least 10 Pa.s,
or (φs4) a mixture of at least one oil (A) and of the catalytic compound (E), optionally in the presence of at least one silane (C).

Even more preferably, the silicone phase φs consists of:
(φs1) an oil (A) with a viscosity from about 50 to 1 000 Pa.s,
(φs2) a mixture of oils (A), this mixture having a viscosity from about 50 to 1 000 Pa.s,
(φs3) a mixture of at least one oil (A) and of at least one crosslinking agent (B) if the latter is necessary and/or a silane (C), this mixture having a viscosity from about 50 to 1 000 Pa.s,
or (φs4) a mixture of at least one oil (A) and of the catalytic compound (E), optionally in the presence of at least one silane (C).

As regards other functional additives (G) that may be used, they are especially plasticizers and/or salts and/or thickeners and/or filler dispersants, the latter agents preferably being selected from the group of anionic hydrophilic functional products and even more preferably from the group comprising polyacrylates and/or (poly)phosphates.

These additives may also or more specifically be:
plasticizers such as, for example, polydimethylsiloxane oils with a viscosity from about 300 to 10 000 mPa.s, dioctylphthalates, dialkylbenzenes optionally in aqueous emulsion, in amounts from 0 to 70 parts by weight per 100 parts by weight of oil (A);

thickeners, for instance water-soluble polymers of molecular weight greater than 10 000 g/mol, such as, for example, alkali metal polyacrylates, polyvinyl alcohols, polyethylene glycols, polyvinylpyrrolidones, carrageenans, alginates, methylcelluloses, hydroxyalkylcelluloses and xanthan gum in amounts that may be up to 10% by weight of the final aqueous dispersion;

filler dispersants such as, for example, alkali metal polyacrylates of molecular mass less than 5 000, and mineral phosphates in amounts that may be up to 10% by weight of the final aqueous dispersion;

optionally, mineral or organic pigments in an amount of less than 4% and preferably 2% by weight relative to the total mass of the dispersion.

These additives (G) may be introduced either into the silicone phase before it is emulsified, or into the emulsion before dilution.

According to another of its aspects, the present invention relates to a process for preparing an aqueous dispersion of silicone oils, especially those described above, which comprise:

A—100 parts by weight of oil(s) (A) of at least one organopolysiloxane oil (A) capable of crosslinking into an elastomer by condensation, if necessary in the presence of a crosslinking agent (B);

B—if necessary, from 0.1 to 100 parts by weight of at least one crosslinking agent (B);

C—optionally, up to 50 parts by weight of at least one adhesion promoter (C)—preferably a silane—;

D—up to 200 parts by dry weight of a siliceous mineral filler (D);

E—a catalytically effective amount of a catalytic curing compound (E), which may be up to 3 parts by weight;

F—at least one emulsifier (F);

G—at least one functional additive (G);

H—and water; this process comprising the following essential steps:

I—preparation of an emulsion by blending a mixture consisting of:
100 parts by weight of a silicone phase ($\phi$s) with a dynamic viscosity at 25° C. of at least 10 Pa.s, this silicone phase comprising the oil or mixture of oils (A) already polymerized, and optionally at least one of the constituents (B), (C) or (E);
0.5–20 parts by weight of at least one emulsifier (F), the HLB value of said emulsifier or of the mixture of emulsifiers being at least 10;
2–20 parts by weight of water; the water/water+emulsifier(s) weight ratio being such that the viscosity of the water+emulsifier(s) mixture is in the region of or greater than half that of the silicone phase ($\phi$s);
for a period and under shear conditions that are sufficient to obtain an "oil-in-water" emulsion with a particle size from about 0.1 to 5 micrometers;

II—optional dilution with water until a solids content from 25% to 97% is obtained;

III—and then addition of the constituent(s) not present in the silicone phase ($\phi$s); this process being characterized in that at least one substep of incorporation of a filler (D) in the form of (an) aqueous suspension(s) of at least one hydrophilic compound is envisioned, with the conditions according to which:

when this filler (D) consists at least partly of at least one aqueous suspension of colloidal silica, then this (or these) aqueous suspension(s) of filler (D) is (are) introduced in total into the blending chamber before producing the emulsion;

when this filler (D) consists at least partly of an aqueous suspension of organic (co)polymer(s), then at least some of this (or these) aqueous suspension(s) of filler (D) is (are) introduced into the blending chamber before producing the emulsion.

The process according to the present invention preferably has all the characteristics given above with reference to the description of the aqueous silicone dispersions according to the invention.

According to one preferred and specific mode of the process according to the invention, the substep(s) of incorporating the aqueous suspension(s) of filler (D) take(s) place:

during step I in a fraction of between 2% and 100%, and preferably between 3% and 100% by dry weight of the total amount of filler (D) in dry form;

and during step II and/or III, preferably III.

Thus, the moment(s) for introduction of the aqueous suspension of hydrophilic filler (D) is (are) chosen as a function of the reological and/or mechanical characteristics that it is desired to obtain for the aqueous silicone dispersions according to the invention, and as a function of the nature of the hydrophilic filler (D).

In accordance with the invention, at least some of the water is provided by the aqueous dispersion of hydrophilic filler (D).

It is particularly advantageous to control the amount of water supplied to the aqueous silicone dispersion, by means of the liquid filler constituent.

Advantageously, the "oil-in-water" emulsification of the silicones phase is performed:

by introducing the silicone oil (A) into a mixture of water and/or aqueous suspension(s) of filler (D)+emulsifier(s) (F);

or by introducing water and/or aqueous suspension(s) of filler (D) into a mixture of silicone phase ($\phi$s)+emulsifier(s) (F) and blending at a temperature from about 10 to 50° C.

Any standard blending machine may be used, especially slow stirring machines. Thus, the blending operation may be performed in a blender equipped with a stirrer, the mobile part of which stirrer does not to rotate:

at more than 2500 rpm with a tangential speed at the end of the mobile part not exceeding 20 m/s; and a ratio of the tangential speed at the end of the mobile part to the distance between the end of the mobile part and the wall of the blender, of less than 50 000 s$^{-1}$;

at more than 1500 rpm with a tangential speed at the end of the mobile part not exceeding 5 m/s and a ratio of the tangential speed at the end of the mobile part to the distance between the end of the mobile part and the wall of the blender, of less than 10 000 s$^{-1}$;

at more than 500 rpm with a tangential speed at the end of the mobile part not exceeding 2.5 m/s and a ratio of the tangential speed at the end of the mobile part to the distance between the end of the mobile part and the wall of the blender, of less than 2500 s$^{-1}$.

Examples that may be mentioned include single-screw or multi-screw extruders, planetary blenders, hook blenders, slow dispersers, static blenders, paddle blenders, impeller blenders, arm blenders and anchor blenders.

After optional dilution of the medium, the constituents of the dispersion of the invention not present in the "oil-in-water" emulsion thus prepared, namely:

in the case of the emulsion of the silicone phase ($\phi$1), ($\phi$2) or ($\phi$3), the catalytic compound (E) preferably in the form of an aqueous emulsion and the other optional constituents not present in said phases;

in the case of the emulsion of the silicone phase (φ4), the crosslinking agent (B) if the latter is necessary, and also the other optional constituents not present in said phase;

and, in all cases, an optional suspension of filler (D);

are introduced into and dispersed in the medium by blending in a blender (step III) of the same type as those mentioned above, preferably in the blender used for the emulsification (step I).

The various constituents of the dispersion of the invention are present in amounts such that the solids content is greater than 40%, generally from about 70% to 97%; the pH is adjusted to between 4 and 13 by addition of organic or mineral acids or bases (for example potassium hydroxide or amines).

The final dispersion obtained is homogenized and then degassed; it is then packaged in airtight and water vapour-proof packaging.

Advantageously, this process comprises at least one substep of incorporating a filler (D') in pulverulent form, which has a specific surface area Ss (in $m^2/g$) such that:

$Ss \leq 5$ preferably $Ss \leq 3$

Finally, the present invention is directed toward the use of the aqueous silicone dispersions described above, in unmodified form or as products obtained by the process also defined above, for the manufacture of elastomeric paints, water-repellent paints for facades, leakproofing seals, flame-retardant elastomeric products, concentrated mastics, elastomeric coating products, water-repellent or flame-retardant protective coverings that may be sprayed (as a thin or thick layer) and also coverings for use in roofing (i.e. silicone elastomer coverings on polymer foams (for example two-pack polymethane) used especially for insulating the roofs of buildings.

According to another of its subjects, the invention also relates to a concentrated mastic based on the dispersion described above. This mastic is characterized in that it has a solids content of greater than or equal to 80% by weight and preferably greater than or equal to 85% by weight.

To prepare such a concentrated mastic, it is advantageous to use an aqueous colloidal suspension of filler (D) having a titer of 40%–85% by weight of (D) relative to the solids, and preferably from 65% to 80% by weight of (D) relative to the solids.

The examples are given as a guide and cannot be considered as limiting the field and spirit of the invention.

EXAMPLES

Example 1

Paint/Film-forming Covering Formulation with Aqueous Dispersion ("Slurry") of $CaCO_3$ I—Preparation of the Emulsion:

Introduction of 33.5 kg of 48 V 135000 oil (A) from Rhodia Silicones (α,ω-dihydroxylated poly-dimethylsiloxane silicone oil, viscosity=135000 mPa.s, with a titer of about 300 ppm of OH by weight), 1.843 kg of a hydroxylated silicone resin—crosslinking agent (B)—(Resin (B) from Rhône-Poulenc, containing MDT units, with 0.5% by weight of OH groups, and consisting of 62% by weight of units T ($CH_3SiO_{3/2}$), 24% by weight of units D [$(CH_3)_2SiO_{2/2}$] and 14% by weight of units M [$(CH_3)_3SiO_{1/2}$], 1.575 kg of Rhodasurf ROX—surfactant (F)—(aqueous solution containing 85% ethoxylated fatty alcohol from Rhodia) and 0.52 kg of demineralized water (H) into the tank of a 100 liter Neulinger butterfly-type planetary blender (equipped with a stirrer) and a planetary dispersion arm, and also a scraping stirrer. Stirring for 60 minutes at a speed of 400 rpm for the butterfly and 42 rpm for the doctor blade. Production of a silicone/water emulsion with a mean particle size of 567 nm (measured using a Coulter LS 130 machine from the company Coultronics). The bulk temperature reaches 45° C.

II—Gradual dilution of the emulsion by introducing over 15 minutes 12.507 kg of demineralized water (H) with stirring (butterfly at 400 rpm and doctor blade at 21 rpm).

III—Compounding:

The temperature is 35° C. After reducing the stirring speed of the butterfly, introduction over 2 min of 1 kg of Silquest VS 142 from Witco—adhesion promoter (C)—(aqueous solution containing about 25% of amino silane) and, over 15 minutes, 46.9 kg of an aqueous dispersion containing 72% of $CaCO_3$ filler (D) (Omyacoat 80 from the company Omya). The temperature is 29° C.

Finally, 0.109 kg of an aqueous emulsion with a titer of 38% of dioctyltin dilaurate stabilized with polyvinyl alcohol—catalyst (E)—(emulsion 70827 A from Rhodia) is added, and stirred for a further 15 minutes, the speeds of the butterfly and the doctor blade being 200 and 42 rpm, respectively.

The composition is then degassed by stirring under the same conditions for 10 minutes under a vacuum of 150 mbar, then packaged in 25 kg pails (metallic and Epikote-treated) and in water vapour-proof polyethylene cartridges. It has a solids content of 72%.

The results of the evaluation of the product obtained are given in table 1.

Evaluation Methods:

Protocol for Measuring the Degree of Coalescence T of the Emulsion in the Mastic:

The content of residual emulsion in the final product is determined according to protocol P below: a 10% dilution of the product in demineralized water is prepared, by stirring with a magnetic bar for 20 minutes. The dilute product is rapidly transferred into a centrifugation bucket and centrifuged for 30 minutes at 3000 rpm in a Heraeus Chris 1729/1800 centrifuge in order to separate out the solid fillers. The nonsolid phase (emulsion) is withdrawn and its solids content is measured by drying in a Mettler infrared thermobalance (4 g dried for 1 hour with a nominal temperature of 120° C.). The solids content of the dilute emulsion thus measured is then compared with the theoretical solids content calculated from the composition by assuming that the initial emulsion is intact and by integrating the degree of dilution. If the emulsion is not broken during the formulation with the fillers, the residual emulsion content is 100%; when a total coalescence of the emulsion has taken place during blending with the fillers this content is zero. The residual emulsion content is defined by the relationship:

$T(\%)=100\times$(measured solids content)/(theoretical solids content)

The content of emulsion coalesced (or broken) during mixing with the fillers is C (%)=100−T NB: it was verified that by applying the protocol to an emulsion not blended in the presence of fillers, the measurement makes it possible to find the theoretical solids content, i.e. T=100% of residual emulsion.

Measurement of the Mechanical Properties:

The mastic is spread as a 2 mm film (using a calibrated doctor blade) over a nonstick terphane sheet so as to be able to measure after drying (seven days in an air-conditioned room at 23° C. and 50% RH) the following mechanical properties:

the Shore A hardness according to ASTM standard D-2240 (on three stacked 2 mm films)
the breaking strength (in MPa) according to AFNOR standard T 46 002 corresponding to ASTM standard D 412,
the elongation at break (in %) according to AFNOR T 46 002,
the elastic modulus at 100% elongation (in MPa) according to AFNOR standard T 46 002.

Evaluation of the Adhesion:

Finally, the adhesion of the mastic to various supports (glass, aluminum, PVC, etc.) is assessed by manual peeling of a film 0.5 mm thick dried for 14 days on the test support.

Comparative Example 2

Paint/Film-forming Covering Formulation with Hydrophobic $CaCO_3$

I—Preparation of the emulsion: the emulsion according to example 1 is again prepared, and the mean particle size of the emulsion obtained is very similar (550 nm, at a temperature of 41.5° C.).

II—this emulsion is diluted (in the same blender as previously) with 16.72 kg of demineralized water (added gradually over 15 minutes, butterfly at 400 rpm and doctor blade at 21 rpm, the temperature decreases to 31° C.).

III—Compounding: 0.804 g of Coatex P50 from the company Coatex (dispersant (G) based on sodium polyacrylate) and 1 kg of Silquest VS142 adhesion promoter=silane (C) are added (these two additives are introduced over two minutes each), with the butterfly at 200 rpm and the doctor blade at 21 rpm. After switching off the stirring, 12.56 kg of Socal 312 (treated precipitated $CaCO_3$ from Solvay, with a specific surface area of 20 $m^2/g$) are added and dispersed for two minutes with the butterfly at 200 rpm and the doctor blade at 42 rpm. After stopping the mixer again, 12.56 kg of Socal 312 are added and dispersed as above by stirring for two minutes. 16.75 kg of BLR3 (treated natural $CaCO_3$ from the company Omya, with a low specific surface area) are then added and dispersed as above by stirring for four minutes. After reducing the speed of the scraping stirrer to 21 rpm, 12.28 kg of demineralized water are then added over 10 minutes, followed by addition of 0.109 kg of emulsion 70827A over one minute, and stirring is continued for about a further 10 minutes to obtain a thoroughly homogeneous mixture. The final product is degassed by stirring for five minutes under a vacuum of 100 mbar, and is then packaged in 25 kg pails and in polyethylene cartridges. The solids content of the final product is 71.7%.

The results of the evaluation of the product obtained are collated in table 1.

Comparative Example 2a

Paint/Film-forming Covering Formulation with Powdered Hydrophilic $CaCO_3$

I—Preparation of the emulsion: the emulsion according to example 1 is again prepared, and the mean particle size of the emulsion obtained is very similar (560 nm, at a temperature of 42° C.).

II—this emulsion is diluted (in the same blender as previously) with 16.72 kg of demineralized water (added gradually over 15 minutes, butterfly at 400 rpm and doctor blade at 21 rpm, the temperature decreases to 31° C.).

III—Compounding: comparative example 2 is repeated, but replacing the 25 kg of Socal 312 with 13.4 kg of Socal 31 from Solvay (which has the same specific surface area of 20 $m^2/g$, but is not treated with stearic acid). The solids content of the final product is 68.4%.

The results of the evaluation of the product obtained are collated in table 1.

TABLE 1

| | Example 1 (slurry of $CaCO_3$) | Example 2 (hydrophobic $CaCO_3$ in powder form) | Example 2a (hydrophilic $CaCO_3$, in powder form) |
|---|---|---|---|
| Residual emulsion content T | 88.8% | 37% | 65% |
| Coalesced emulsion content C | 11.2% | 63% | 35% |
| Brookfield viscosity A7V5 (Pa · s) | 56 | 46.4 | 28.4 |
| Appearance of the 2 mm films | Smooth | Slightly granular | Granular |
| Mechanical properties measured after 15 days in a cartridge and drying for 7 days: | | | |
| Hardness (Shore A) | 28 | 45 | 28 |
| Breaking strength (MPa) | 1.27 | 0.85 | 0.63 |
| Elongation at break (%) | 902 | 427 | 180 |
| Modulus at 100% elongation (MPa) | 0.38 | 0.57 | 0.33 |
| Mechanical properties measured after 3 months in a cartridge and drying for 7 days | | | |
| Hardness (Shore A) | 29 | Not measurable (poorly cohesive film) | 29 |
| Breaking strength (MPa) | 0.60 | Not measurable (poorly cohesive film) | 0.63 |
| Elongation at break (%) | 356 | Not measurable (poorly cohesive film) | 200 |
| Modulus at 100% elongation (MPa) | 0.43 | Not measurable (poorly cohesive film) | 0.5 |
| Application using an airless gun | Smooth film | Degraded appearance | Impossible |
| Adhesion to PUR foam (evaluated by manual peeling) | Good | Mediocre | Average |

It emerges from the previous tests that the use of carbonate in predispersed form—$CaCO_3$ colloidal suspension filler (D)—makes it possible, compared with the control produced with powdered hydrophobic $CaCO_3$, to preserve the quality of the emulsion, which has a direct influence on the properties of the final product: more attractive appearance, better mechanical properties and adhesion, better conservation on storage, and better resistance during use (pressurized spraying). With hydrophilic carbonate introduced in powder form, there is less degradation of the emulsion than with hydrophobic carbonate (partly because a smaller dose of carbonate was used); however, the granular appearance of the film obtained on drying is unacceptable, the elastomer has a smaller elongation at break, and the wet product could not be applied using an airless gun (clogging).

Example 3

Mastic Based on CaCO₃ Slurry Introduced During Emulsification

Introduction of 465 g of oil—(A)—48V135 000; 35 g of oil—(A)—47V100 from Rhodia (polydimethylsiloxane oil with a viscosity of 100 mPa.s), 5 g of resin/crosslinking agent—(B)—, 23.5 g of Rhodasurf ROX—(F)—and 27.5 g of Omyacoat—(D)—80, into the tank of a laboratory IKA reactor equipped with a scraping anchor stirrer. By stirring at 80 rpm, an oil/water emulsion is rapidly obtained, but the stirring is continued for 45 minutes in order to thoroughly refine and homogenize the aqueous dispersion. After introduction of a further 625 g of Omyacoat 80—(D)—, stirring is continued for a further 25 minutes, followed by addition (with continued stirring at the same speed) of 32.5 g of VS142—silane promoter (C)—(over five minutes), 350 g of BLR3 (CaCO₃ of low specific surface area) (over five minutes) and 1.8 g of 70827 A—emulsion (over five minutes). The final mastic is degassed by stirring for five minutes under a vacuum of 30 mbar and is then packaged in polyethylene cartridges. Throughout the test, the temperature is maintained between 16 and 21° C. by circulating cold water in the jacket of the mixer. The solids content of the final product is 86.4%.

The characteristics and properties of the mastic are collated in table 2.

The emulsification in the presence of predispersed filler offers the possibility of producing concentrated dispersions with a low surfactant content (adhesive):

Example 4 (Comparative)

Mastic Based on Powdered CaCO₃ (Socal 312—Standard Formulation)

The objective of this comparative test is to repeat example 3, replacing the CaCO₃ slurry with powdered CaCO₃ of high specific surface area, but, in order to prevent the coalescence of the emulsion (given the result of the comparative example 2), the surfactant content is increased and polyacrylate dispersant is introduced. The coalescence test makes it possible to show that, by means of this modification, the emulsion is not disrupted by the addition of the pulverulent filler, but it has reduced adhesion to the various supports targeted for the application of the product.

Performing the Test:

Introduction of 558 g of oil—(A)—48V 135 000, 42 g of oil—(A)—47V100 from Rhodia (polydimethylsiloxane oil with a viscosity of 100 mPa.s), 6 g of crosslinking resin (B)—, 42 g of Rhodasurf ROX—surfactant (F)—and 13.2 g of demineralized water, into the tank of a laboratory IKA reactor equipped with a scraping anchor stirrer. By stirring at 80 rpm, an oil/water emulsion is rapidly obtained, but the stirring is continued for 40 minutes to allow a mean particle size of 0.5 pm to be obtained. The emulsion is diluted by gradual addition of 129.6 g of demineralized water—(H)—with stirring for 30 minutes. After reducing the stirring speed to 60 rpm, 14.4 g of Coatex P50—polyacrylate dispersant (G)—(over five minutes), 39 g of VS142—adhesion promoter=silane (C) (over five minutes), 300 g of Socal 312 powdered CaCO₃ (filler D') (over ten minutes), 300 g of powdered CaCO₃ BLR3 of low specific surface area (filler D') (over ten minutes) and 2 g of 70827 A—catalytic emulsion (E) (over five minutes) are successively introduced. The final mastic is degassed by stirring for five minutes under a vacuum of 30 mbar and is then packaged in polyethylene cartridges.

The solids content of the final product is 86.8%.

The characteristics and properties of the mastic are collated in table 2.

Example 4a (Comparative)

Mastic Based on Powdered Hydrophilic CaCO₃ (Socal 31)

Example 4 is repeated, replacing the Socal 132 with Socal 31. The properties of the mastic were not measured, since it has a very granular appearance.

TABLE 2

|  | Example 3 (CaCO₃ slurry) | Example 4 (powdered treated CaCO₃) |
|---|---|---|
| Residual emulsion content T | 98% | 97% |
| Coalesced emulsion content C | 2% | 3% |
| Boeing flowability (mm) | 0 | 0 |
| Appearance of the 2 mm films | Smooth | Smooth |
| Mechanical properties measured after 1 month in a cartridge and drying for 7 days: | | |
| Hardness (Shore A) | 23 | 16 |
| Breaking strength (MPa) | 0.92 | 0.65 |
| Elongation at break (%) | 402 | 523 |
| Modulus at 100% elongation (MPa) | 0.47 | 0.30 |
| Adhesion evaluated by peeling after 1 month in a cartridge and drying for 7 days on the support (silicone film 2 to 3 mm thick): | | |
| Adhesion to glass | Good | Good |
| Adhesion to wood | Good | Good |
| Adhesion to anodized aluminum | Good | Good |
| Adhesion to concrete | Good | Poor |
| Adhesion to PVC | Slight | None |
| Adhesion to PUR foam | Good | Mediocre |

It emerges from these tests that, by increasing the dose of surfactant, the composition based on powdered CaCO₃ regains a high residual emulsion content, but at the expense of the adhesion, which on several supports is poorer than that developed by the composition based on hydrophilic carbonate slurry.

Example 5

Mastic Based on Colloidal Silica Introduced During Emulsification

Introduction of 480 g of oil (A)—48V135 000, 120 g (25%) of Progiline 55 from Chevron—surfactant (F)—(alkylbenzene), 45 g (9.3%) of crosslinking resin (B)—, 10.6 g (2.2%) of Rhodasurf ROX—surfactant (F)—and 150 g (31.25%) of Ludox TM50 from Dupont—liquid filler+powder (D) (aqueous dispersion of colloidal silica containing 50% (15.6%) of SiO₂) into the tank of a laboratory IKA reactor equipped with a scraping anchor stirrer. By stirring at 100 rpm, an oil/water emulsion is rapidly obtained, but the stirring is continued for 1 hour 30 minutes in order to thoroughly refine and homogenize the aqueous dispersion, the mean particle size of which, determined using a Coulter 130 machine, is 1.85 μm. This emulsion is diluted by gradual addition of 30.2 g of demineralized water over 10 minutes with stirring. 42 g of VS142—silane promoter (C) are then added (over five minutes) (with continued stirring at the same speed), followed by addition of 3 g of 70827 A—catalytic emulsion (E)—(over five minutes). The final mastic is degassed by stirring for five minutes under a vacuum of 35 mbar and is then packaged in polyethylene cartridges. Throughout the test, the temperature is maintained between 16 and 22° C. by circulating cold water in the jacket of the mixer.

The mean particle size of the final dispersion is 1.5 μm and its solids content is 84%.

The characteristics and properties of the mastic are collated in table 3.

Example 6

Mastic Based on Colloidal Silica Introduced Before Emulsification

Introduction of 700 g of oil—(A)—48V135 000, 49 g of resin—crosslinking agent (B)—12.4 g of Rhodasurf ROX—surfactant (F)—and 218.8 g of Snowtex 40—filler (D) in suspension=from Nissan Chem. Ind. Ltd (aqueous dispersion of colloidal silica containing 40% of $SiO_2$) into the tank of a laboratory IKA reactor equipped with a scraping anchor stirrer. By stirring at 100 rpm, an oil/water emulsion is rapidly obtained, but the stirring is continued for 2 hours in order to thoroughly refine and homogenize the aqueous dispersion, the mean particle size of which, determined using a Coulter 130 machine, is 2.85 μm. 45.5 g of VS142—silane adhesion promoter (C)—are then added (over five minutes), followed by addition of 3.5 g of 70827 A—catalytic emulsion (E)—(over five minutes). The final mastic is degassed by stirring for five minutes under a vacuum of 37 mbar and is then packaged in polyethylene cartridges. Throughout the test, the temperature is maintained between 19 and 25° C. by circulating cold water in the jacket of the mixer.

The mean particle size of the final dispersion is 1.3 μm and its solids content is 85.6%.

The characteristics and properties of the mastic are collated in table 3.

Comparative Example 7

Mastic Based on Powdered Silica (Thixosil 365 Test)

Introduction of 800 g of oil—(A)—48V 135 000, 24 g of resin—crosslinking agent (B)—18.8 g of Rhodasurf ROX—surfactant (F)—and 40 g of Ludox TM50—liquid filler+powder (D)—into the tank of a laboratory IKA reactor equipped with a scraping anchor stirrer. By stirring at 100 rpm, an oil/water emulsion is rapidly obtained, but the stirring is continued for 2 hours in order to thoroughly refine and homogenize the aqueous dispersion, the mean particle size of which, determined using a Coulter 130 machine, is 2.5 μm. The stirring speed is reduced to 60 rpm, the emulsion is diluted by adding 109.5 g of demineralized water, and 40 g of Thixosil 365 from Rhodia (powdered precipitated silica of high specific surface area) are then introduced and dispersed for 20 minutes with stirring. 52 g of VS142—adhesion promoter (C) are then added (over five minutes), followed by addition of 2.6 g of 70827 A (over five minutes). The final mastic is degassed by stirring for five minutes under a vacuum of 37 mbar and is then packaged in polyethylene cartridges. Its solids content is equal to 84%.

Throughout the test, the temperature is maintained between 20 and 26° C. by circulating cold water in the jacket of the mixer.

The characteristics and properties of the mastic are collated in table 3.

TABLE 3

|  | Example 5 | Example 6 | Example 7 |
|---|---|---|---|
| Boeing flowability (mm) | 0 | 0 | — |
| Appearance of the 2 mm films | Smooth | Smooth | — |
| Mechanical properties measured after 1 month in a cartridge and drying for 7 days: |  |  | The product still extrudes from the cartridge, but it can no longer be spread with a spatula since it is elastic |
| Hardness (Shore A) | 10 | 19 | Not measurable |
| Breaking strength (MPa) | 0.61 | 1.15 | Not measurable |
| elongation at break (%) | 379 | 494 | Not measurable |
| Modulus at 100% elongation (MPa) | 0.20 | 0.34 | Not measurable |
| Adhesion evaluated by peeling after 1 month in a cartridge and drying for 7 days on the support (silicone film 2 to 3 mm thick): |  |  |  |
| Adhesion to glass | Good | Good | Not measurable |
| Adhesion to wood | Good | Good | Not measurable |
| Adhesion to anodized aluminum | Good | Good | Not measurable |
| Adhesion to concrete | Average | Average | Not measurable |
| Adhesion to PVC | Good | Good | Not measurable |

Although formulated with a composition very similar to those of the previous tests (content of surfactant and of reactive species), but with a powdered filler (D) of high specific surface area, the mastic of example 7 prepared with the powdered hydrophilic silica is not stable, and turns to a gel after storage for a few weeks in a cartridge at room temperature. In contrast, the compositions of examples 5 and 6 can be stored in a cartridge under the same conditions for more than one year.

The invention claimed is:

1. A process for the preparation of an aqueous dispersion of silicone oil(s) comprising:
   100 parts by weight of at least one polyorganosiloxane oil (A) capable of crosslinking into an elastomer by condensation, if necessary in the presence of a crosslinking agent (B);
   optionally, from 0.1 to 100 parts by weight of at least one crosslinking agent (B);
   optionally, up to 50 parts by weight of at least one adhesion promoter (C);
   greater than 0 up to 200 parts by dry weight of a filler (D);
   a catalytically effective amount of a catalytic curing compound (E);
   at least one emulsifier (F);
   optionally, at least one functional additive (G); and
   water;

said process comprising the steps of:
preparing an emulsion by blending a mixture consisting of:
100 parts by weight of a silicone phase (φs) with a dynamic viscosity at 25° C. of at least 10 Pa.s, φs comprising the oil or a mixture of oils (A) already polymerized, and optionally at least one of the constituents (B), (C) or (E);
0.5–20 parts by weight of at least one emulsifier (F), the HLB value of said emulsifier or of the mixture of emulsifiers being at least 10;
the filler (D);
2–20 parts by weight of water;
with a water/water and surfactant(s) weight ratio being such that the water and the surfactant(s) makes a mixture having a viscosity in the region of or greater than half that of the silicone phase (φs);
for a period and under shear conditions that are sufficient to obtain an "oil-in-water" emulsion with a particle size from about 0.1 to 5 micrometers;
optionally, diluting with water until a solids content from 25% to 97% is obtained; and, then, adding the constituent(s) not present in the silicone phase (φs) and the filler (D);
the filler (D) being supplied in the form of (an) aqueous suspension(s) of at least one hydrophilic compound, with the proviso that:
when the filler (D) is at least partly in the form of at least one aqueous suspension of colloidal silica, then this (or these) aqueous suspension(s) of filler (D) is (are) introduced into a blending chamber before producing the emulsion; or
when the filler (D) is at least partly in the form of at least one aqueous suspension of organic (co)polymer(s), then at least some of this (or these) aqueous suspension(s) of filler (D) is (are) introduced into a blending chamber before producing the emulsion, said dispersion further comprising a filler (D'), which is added in the process for obtaining the dispersion, in pulverulent form, and whose specific surface area Ss (in m$^2$/g) is:
Ss≦5.

2. The process as claimed in claim 1, wherein the oils (A) are α,ω-hydroxylated oils or functional oils comprising, per molecule, at least 2 functional groups.

3. The process as claimed in claim 2, wherein the oils (A) have the general formula (I)

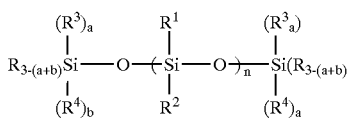

wherein:
$a$ is 0 or 1
$b$ is 0 or 1
with $a+b=0$; 1 or 2
$n$ has a value that is sufficient to give the polymer of formula (a) the desired viscosity the radicals R are identical or different and represent:
an OH group with $a+b=2$;
an alkoxy or alkenyloxy group containing from 1 to 10 carbon atoms;
an aryloxy group containing from 6 to 13 carbon atoms;
an acyloxy group containing from 1 to 13 carbon atoms;
a ketiminoxy group containing from 1 to 8 carbon atoms; or
an amino-functional or amido-functional group containing from 1 to 6 carbon atoms, linked to the silicon via an Si-N bond;
the radicals R$^1$ and R$^2$ are identical or different and represent alkyl or alkenyl aliphatic organic groups containing from 1 to 10 carbon atoms, or phenyl aromatic groups, said groups optionally being substituted with halogen atoms or cyano groups;
the radicals R$^3$ and R$^4$ are identical or different and represent alkyl, aminoalkyl, polyaminoalkyl, epoxyalkyl or alkenyl aliphatic organic groups, containing from 1 to 13 carbon atoms, or aryl aromatic groups containing from 6 to 13 carbon atoms.

4. The process as claimed in claim 3, wherein at least 80% of the radicals R$^1$ to R$^4$ represent a methyl group.

5. The process as claimed in claim 3, wherein the adhesion promoter is a silane (c) of the formula:

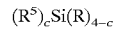

wherein:
$c$ is 0; 1 or 2
the radicals R$^5$, which are identical or different, correspond to the radicals R$^3$ and R$^4$ of the oil (A) of formula (I)
the radical R corresponds to the organic radical R of the polyorganosiloxane oil (A) of formula (I)
said silane being present in amounts of about from 0 to 10 parts by weight per 100 parts of oil(s) (A).

6. The process as claimed in claim 1, wherein the crosslinking agent (B) is sodium silicate, an alkali metal organosiliconate, a microemulsion of silsesquioxane resin, a reactive silicone resin of low molecular mass containing alkoxy and acyloxy groups, a silicone resin of high mass, which is insoluble in toluene, a hydroxylated silicone resin, an alkoxysilane, an alkylaminosilane or an alkylamidosilane.

7. The process as claimed in claim 1, wherein the the silane (C), is an adhesion-modifying additive and is aminopropyltriethoxysilane, aminopropylmethyldiethoxysilane or glycidoxypropyltrimethoxysilane, which is present in amounts of up to 50% of the weight of oil(s) (A).

8. The process as claimed in claim 1, wherein the catalytic curing compound (E) is a tin derivative used in amounts of from 0.05 to 1 part by weight per 100 parts of oil (A).

9. The process as claimed in claim 1, wherein the silicone phase (φs) consists of:
(φs2) an oil (A) with a viscosity of at least 10 Pa.s,
(φs2) a mixture of oils (A), this mixture having a viscosity of at least 10 Pa.s,
(φs3) a mixture of at least one oil (A) and of at least one crosslinking agent (B) if the latter is necessary or a silane (C), this mixture having a viscosity of at least 10 Pa.s, or or (φs4) a mixture of at least one oil (A) and of the catalytic compound (E), optionally in the presence of at least one silane (C).

10. The process as claimed in claim 9, wherein the silicone phase ($\phi$s) consists of:

($\phi$s1) an oil (A) with a viscosity from about 50 to 1 000 Pa.s, ($\phi$2) a mixture of oils (A), this mixture having a viscosity from about 50 to 1 000 Pa.s, ($\phi$3) a mixture of at least one oil (A) and of at least one crosslinking agent (B) if the latter is necessary and/or a silane (C), this mixture having a viscosity from about 50 to 1 000 Pa.s, or ($\phi$4) a mixture of at least one oil (A) and of the catalytic compound (E), optionally in the presence of at least one silane (C).

11. The process as claimed in claim 1, further comprising functional additives (G), plasticizers, thickeners, filler, or dispersants.

* * * * *